July 16, 1940.  B. BURNER  2,208,301
CONTROL FOR TRANSMISSIONS
Original Filed Oct. 25, 1934  4 Sheets-Sheet 1

Fig. 1.

INVENTOR:
Bingham Burner,
BY:
Horace Woodward
ATTORNEYS

July 16, 1940.  B. BURNER  2,208,301
CONTROL FOR TRANSMISSIONS
Original Filed Oct. 25, 1934   4 Sheets-Sheet 3

INVENTOR:
Bingham Burner,
BY:
Horace Woodward
ATTORNEYS

INVENTOR:
Bingham Burner,
BY:
Horace Woodward
ATTORNEYS

Patented July 16, 1940

2,208,301

UNITED STATES PATENT OFFICE 2,208,301

CONTROL FOR TRANSMISSIONS

Bingham Burner, Arlington, Va.

Original application October 25, 1934, Serial No. 750,005. Divided and this application February 10, 1939, Serial No. 255,740

9 Claims. (Cl. 74—259)

This application is a division of my copending application for Automatic infinitely variable transmission, filed October 25, 1934, Serial No. 750,005.

The invention relates to controls for motion converting devices and for ratio changing gearing and the like, and with general objects indicated in said application, and has for specific purpose to present a control adapted to operate automatically to vary the ratio relation between a driving or prime mover element and a driven element with the effect of making the most effective application of power to the prime mover to the movement of the driven element proportionate to the load on the driven element.

It is an aim of the invention to present a control specially desirable for use with the transmission disclosed in my prior application in which two gear systems are controlled so as to simultaneously vary their effective transmission of power oppositely.

An important object of the invention is to embody with the device both automatic and manual means to operate the device, so that operation of the manual means (which may also include a pedal, with or without throttle valve connections), will cause variation of the transmission ratio in the device from inert or zero stage to a maximum high ratio stage, normally.

It is also an important attainment of the invention that under normal operation with the throttle or other control set to supply a given amount of power to the driving member, when the load increases, the gear ratio will be automatically lowered so that greater moving force will be applied to the driven member of the transmission, and upon decrease of the load the ratio will be again and automatically increased to the proper maximum.

A further object is to present a novel construction in the load-responsive mechanism for varying the ratio in transmission of motion between the driving and driven element of the transmission.

It is an object to provide such a control which will not vacillate and produce abrupt changes from low to high ratio transmission or vice versa, as might be caused in an automobile by short undulations in roadways if the control were too immediately responsive.

It is also an object to provide such a device which through the automatic functioning of its parts will be safe from damage by excessive hydraulic pressures.

Additional objects, advantages and features of invention reside in the construction, arrangement and combination of parts involved in the embodiment of the invention, as will appear and be understood from the premises and from the following description and accompanying drawings, wherein.

There is illustrated a unitary and combined transmission and automatic control, so that the control is included in the same housing or casing with the transmission itself, and adapted for installation in a conventional motor vehicle chassis. The device includes a driving shaft 10 which may be connected by the usual flanged coupling 11 to the corresponding flange or fly-wheel of a motor (any other coupling may be used), and a driven shaft 12 parallel to the first and therebelow in this instance and provided with a coupling flange 13 (although any other form may be employed), for connecting this shaft directly to a driving shaft of a motor car and/or other mechanical or machine element to be operated.

Construction of gearing

Figure 2:
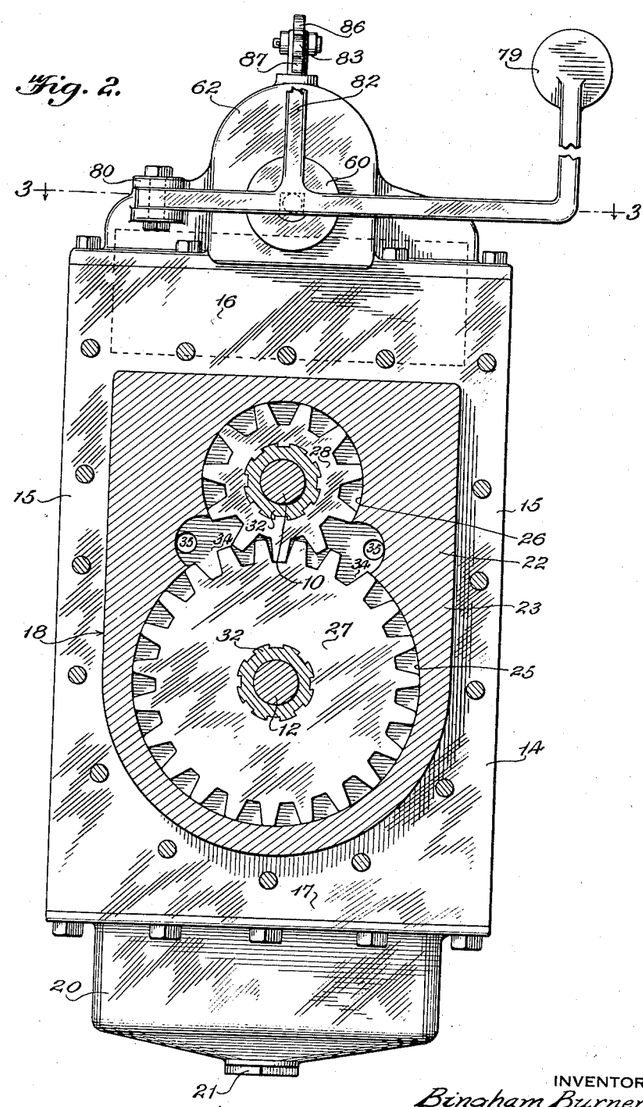
Figure 2 is a view from the right of Figure 1 with the front wall of the case removed.

The unit shown is susceptible of great variation in particular construction while utilizing the inventive features involved, so as to adapt it to various vehicles, and to use in other machines, such as presses, paper mills, etc., but in the present instance includes a housing frame 14 rectangular in plan, which consists of two vertical side walls 15, at right and left, respectively, and connecting upper and lower wall portions 16 and 17 at the front (in the direction of the motor when connected in a vertical plane at right angles to the wall 15); and similar lower and upper wall portions 16' and 17' at the rear side. The wall 16 is simple in form with a horizontal edge at the bottom defining the upper side of an opening 18 (Figure 2) in the front of the housing, the top rectilinear edge of the wall being flush with and in a plane with the rectilinear top edges of the walls 15. The wall 16' is similar except that it is at the bottom of the housing and defines the lower boundary of an opening 19 through the rear of the housing. The wall 17 is in a plane with the wall 16, and has a lower rectilinear edge flush with and in a plane with the rectilinear lower edges of the wall 15. It has an invert semi-circular upper edge concentric with the driven shaft 12 defining the lower boundary of the opening 18 through the front of the housing. The wall 17' is in a similar relation to the shaft 10 forming a proper arch over the opening through the rear of the housing. The front and rear faces of the housing around the openings are smoothly finished, as are the top and bottom faces, which are on the edges of the walls. A removable pressed metal pan 20 suitably flanged is bolted with proper gaskets to the lower face of the housing and it forms the bottom closure thereof, being provided with a drain plug 21. It serves as an oil reservoir, auxiliary to the space within the housing. The housing is of sufficient rigidity and strength to properly sustain certain stresses as a gear transmission box, although, as will appear, it is not subject to stresses as severe as those involved in ordinary or conventional gear-transmission cases, by reason of the manner of construction and installation of the parts to be subsequently described. Neither is it subject to high hydrostatic pressure.

In the front and rear openings of the housing there are set duplicate gear cases 22, each consisting of a flanged case body 23 shaped to set snugly in the front and rear openings of the housing 14, and a cover plate 24 bolted to the case body and to the housing 14 by bolts engaged through the flange 25 of the case, and through the plate 24, suitable gaskets being interposed on both sides of the flange. Each case body has a large circular chamber 25 and a small one 26 in which are snugly fitted respective meshed "low" gears 27 and 28 in the front case, and "high" gears 27' and 28' in the rear case fitted snugly between the inner wall 29 of the case body and the cover plate in each instance. However, one case is inverted relative to the other, the small chamber 26 and gear 28 being at the top in the front case, while the large gear 27' and chamber 25 are at the top in the rear case, concentric with the small chamber at the front.

The shafts 10 and 12 extend concentrically entirely through respective chambers in both these cases as shown, although it is not essential that the extremities opposite the flanges 11 and 13 extend through the plates 24. Revoluble on the shafts but keyed to the adjacent gears respectively there are upper pinions 30 and lower pinions 31 located within the housing between the cases and each having a long hub 32 extending entirely through the inner wall of the respective case and through the adjacent gear and revoluble in a socket bearing 33 in the cover plate. The gears are thereby supported in the cases. There are inlet or outlet port chambers 34 (Fig. 2) formed in the cases at respective sides at the junction of the chambers 25 and 26, and from each of these chambers 34 ports 35 lead through the inner case walls 29 to respective cored ducts 36, 37, 38, 39, formed integrally on the walls 29 of the cases, there being thus two such ducts on each case. These ducts are open at both upper and lower ends on the cases, but have fitted in their lower ends respective pipes 26', 37', 38', 39', with check valves 40 at their lower ends near the bottom of the pan reservoir 20.

These ducts are all preferably enlarged as much as possible, and in the drawings are for convenience much smaller than they would be made in practice. They may be broadened so as to be oblong in cross section or may be of any other desired shape. The upper end of each is finished to provide a seat 42 as in Figures 4 and 5, in which there may engage the corresponding tit 44 on a valve case 45, to be subsequently described. The ends of the ducts next the large chamber 25 are divergent with vertical terminations, so that these ends are spaced further apart than the opposite ends of the ducts and they also stop short of the extreme part of the case.

Figure 1:
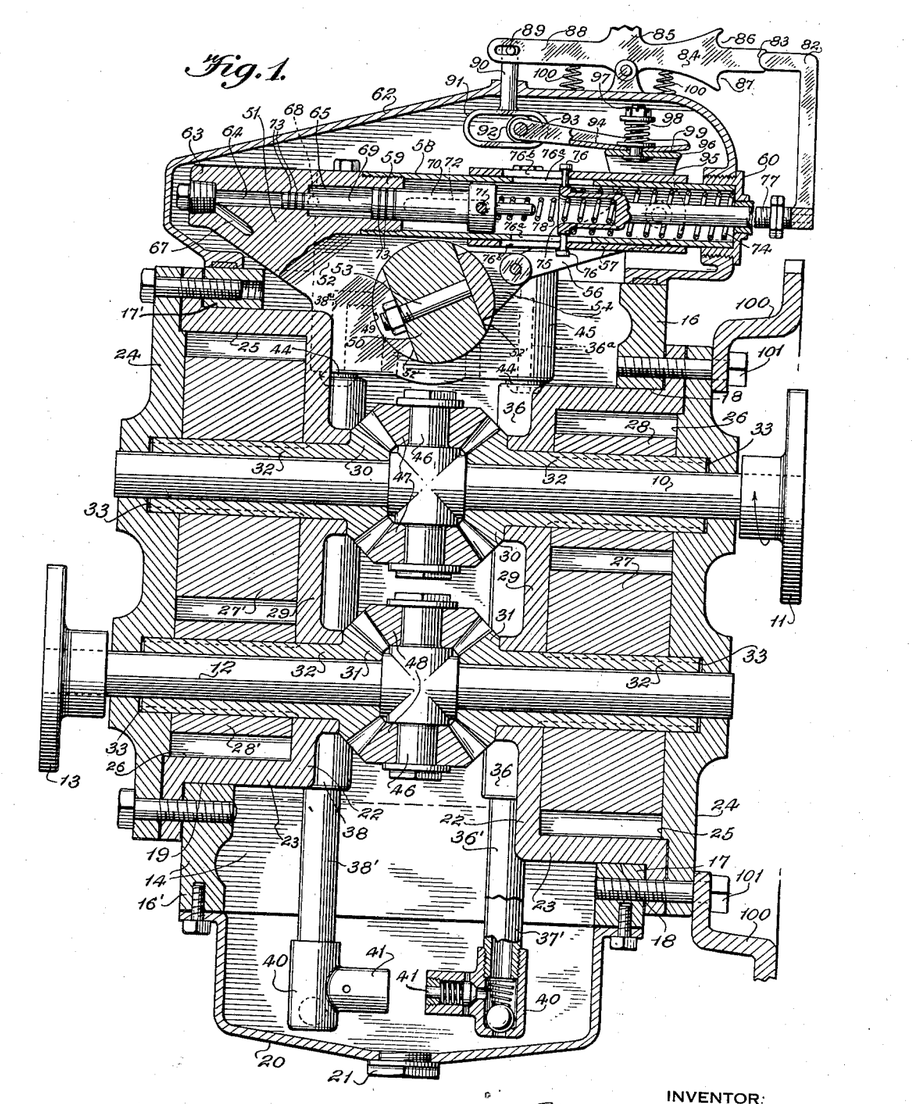
Figure 1 is a vertical section of a complete transmission and automatic control in a unitary system adapted to be assembled and installed in a motor vehicle of standard present-day construction, the view being in a plane coinciding with the axis of the drive shaft of the motor of the vehicle or its equivalent.

The shafts 10 and 12 are each provided with integral stud arms 46 (Fig. 1) midway of their length at right angles to the axes of the respective shafts. On the axes of the shaft 10 are revolubly mounted respective differential gears 47 meshed with the pinions 30 at each side and on the studs of the shaft 12 differentials 48 are similarly engaged with the pinions 31. When the shaft 10 is turned, should either pinion 30 be stopped the other if free, will be turned at twice the speed of the shaft. Likewise, while the other is locked will by engagement with the differential tend to turn the respective shaft in the same direction, at one-half the speed of the operating pinion. If all pinions and shaft 12 are free when shaft 10 is turned, there will be a tendency for all pinions to operate though the advantage will be with the set at the right having the small gear at the top.

The upper differentials 47 may be called the driving differentials, since they normally serve to transmit power by driving the pinions 30 or either, while the ones 48 may be termed the driven differentials since they normally operate by being driven from one or both of the pinions 31 while travelling on one or the other of them, and so carry with them the shaft 12. At times they may move synchronously, as will appear.

Means is provided to lock the set of gears in either case 22, or to retard movement of one set or both with a gradual variation, so that the effects of both sets of gears may be availed of in various proportions whereby the ratio of transmission may be indefinitely varied from a neutral zero, or inoperative idling relation where shaft 12 is stationary, to a maximum or full speed operative relation effected. The same means is also operative to cause at will a reversal of the motion of the shaft 12 from its normal direction, and for other effects as will be explained. This consists in supplying oil to the reservoir 20 which will be pumped by the gears through the ducts, and variably controlling the discharge of this oil.

*The valve*

The ratio changer consists of the valve casing 45 comprising two spaced apart integrally connected end parts having complementary plug valve seats 49 therethrough on a horizontal axis and slightly tapered to receive properly a conical plug valve 50 which extends through the two parts of the case. The casing 45 is formed with four depending tits 44 spaced and arranged to fit simultaneously in the seats 43 at the upper ends of the ducts 36 to 39, of the gear cases, into which they are pressed to a secure seat by a series of bolts 43 engaged through the valve casing and screwed into the cases 22. On account of the inversion of one case so that its larger chamber is above while the smaller chamber of the other is at the top, one case sets higher than the other. By reason of the wider separation of the ends of the ducts adjacent the larger chambers of the cases, it is possible to shorten these duct ends so that they may set on a level with those ends of ducts on the opposite case which come all the way to the end of the case, and so the lower part of the valve casing may be formed symmetrically and with the tits 44 all uniformly disposed at the same level to set in the seats 42 without requiring thinning of the walls of the chamber 25. The two end parts of the casing 45 are spaced so that the high part of the chamber 25 may rise therebetween, and these end parts of the valve casing are joined integrally by an upper rearward body portion 51 above the level of the case 23. Each end part has two tits 44, on opposite sides of the valve 50. In the space at 52 between the two end parts of the valve case, the plug valve is flattened at 52' on opposite sides and drilled centrally of this flattened portion to receive stud bolts 52 by which an operating yoke 54 is secured to the valve, extending forwardly for connection with a control device to be described. From the tits 44 simple port passages 36a, 37a, 38a, and 39a are formed in the valve casing opening on the seats 42 in respective planes transverse to the axis of the valve. In the present instance these port openings are all on a horizontal diametrical plane through the valve and each port is in the same transverse vertical plane with the upper end of its respective duct on the gear case.

Figure 4:
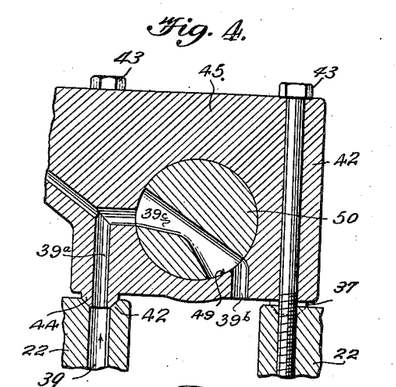
Figure 4 is a cross section of the valve and valve case, on the line 4—4 of Figure 3.
Figure 5:
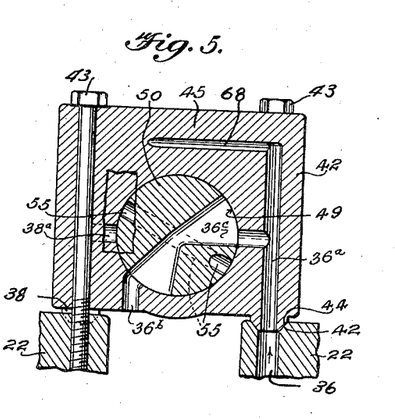
Figure 5 is a similar view on the line 5—5 of Figure 3.
Figure 6:
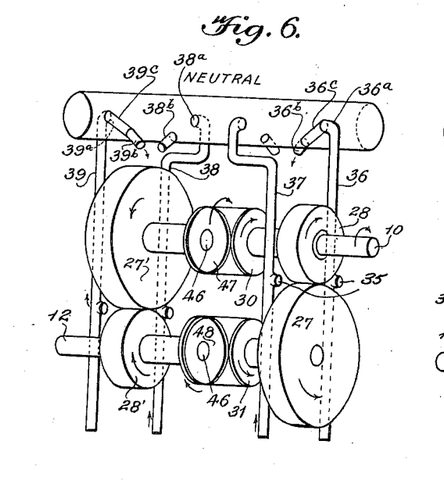
Figure 6 is a diagrammatic view of the system indicating the position of the valve and action of the gearing when the system is in neutral or non-transmission condition.

Spill ports 36b, 37b, 38b, and 39b are formed at the lower and far sides of the valve casing opposite the ports 36a, and 37a, 38a and 39a, respectively, and through the valve there are respective port passages 36c, and 39c, the first of which, at what is termed neutral position, connects the ports 36a—36b and port 39c connects ports 39a and 39b at the same time, as in Figures 4 and 5. There is also included in the valve a port passage 38c, the openings of which are in a plane distinct from that of the planes of openings of the previously described passages in the valve, and adapted to register with ports 38a—38b at the second stage of movement of the valve from neutral position, as will be described.

In addition to the passages in the valve above described, there is a reverse passage 55 (Figures 5 and 9) one end of which opens on the face of the valve in the same transverse plane as the port 36a, while the other end opens on the valve in the transverse plane with the port 38a, both openings of this passage 55 being spaced clockwise from the next adjacent ones on the valve so that they will register with respective said ports 36a—38a of the case when the valve is rotated counter-clockwise one unit of movement from the neutral position.

Now it should be noted that the ports of the passages 36c and 39c are broadened in the transverse plane of the valve in which they are located, and that when considered in their neutral position, and as viewed in Figures 4 and 5, the ends of the passage 36c will be extended beyond the ports 36a and 36b counter-clockwise, while the ends of the port 39c extend beyond the ports 39a—39b in a clockwise direction, for purposes to be explained.

Figure 11:
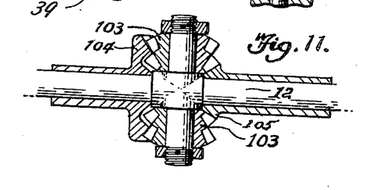

The gears 30 and 31 may be made of different sizes for purposes of ratio variation, and the gears 47—48 may be made double gears of appropriate sizes, as in Figure 11, where shaft 12 is shown with double gear 103 on its studs, meshed with a large pinion 105 at the right. By this arrangement the gear 27' may be smaller in proportion to gear 28' and the speed of the latter pinion correspondingly reduced, or other variations made.

*Operation of the valve*

It will thus be seen that, with the driving shaft 10 connected to the crank shaft of a motor and the driven shaft 12 connected to the common "drive shaft" of a motor vehicle, when the valve is in the neutral position described, the motor is free to turn clockwise as usual, operating both sets of gears as idlers which serve also as pumps taking oil through the lower parts of ducts 37 and 38, and discharging it through ducts 36 and 39 through ports 36a and 39a of the valve casing to ports 36c—39c, of the valve and spill ports 36b—39b of the casing. In this operation the rotation of the shaft 10 with the studs 46 causes the differentials 47 to travel on the pinion 30 of the large gear 27' rotating the opposite pinion 30 and small gear 28 in the same direction as the shaft 10 and somewhat more than twice as fast. This motion is transmitted to the large gear 27 which consequently rotates half as fast counter-clockwise. The shaft 12 being held stationary, the motion of gear 27 is transmitted through the differentials 48 to the gear 28' driving the latter clockwise the same number of revolutions; this moves the large gear 27' counter-clockwise half as fast and it is this movement of the gear while the differential travels thereon which causes the driving of the gears 28—27 at the proper increased speed to permit free idling of the mechanism.

It should be noted that the driven shaft 12 rotates for forward transmission or propulsion in a direction opposite that of the conventional drive shaft and this will require a transposition of the usual ring gear or a bottom drive of the ordinary worm gear.

Movement of the valve 50 one unit clockwise as viewed from the left now moves port 39c out of register with 39a, and also moves port 36c, but the latter being broadened at the ends as before described, remains in register with ports 36a—36b for free venting of oil from the left port chamber 34 of gears 27—28. All other ports are closed. This is the "low" position of the valve for extreme positive low ratio forward transmission. Closing of the port 39a locks the gears 27'—28', forcing the differential 47 to travel less on the pinion 30 of gear 27', and propelling the opposite pinion and gear 28 two revolutions clockwise for one of the shaft 10. This motion transmitted to the gear 27 produces therein one turn counter-clockwise for each turn of shaft 10, and the connected pinion 21 propelling the differentials 48 counter-clockwise on the opposite pinion 31 keyed to the locked gear 28' causes the studs and shaft 12 to move one half turn counter-clockwise, or one turn for each two turns of the motor shaft.

By gradually moving the valve from neutral position toward low position application of power to the driven shaft 12 to overcome inertia of the vehicle or the load, whatever that may be, will be gradual, and the ratio of movement of the driven shaft with respect to that of the driving shaft 10 may be built up from zero to the maximum "low" ratio. If desired, port 38c may also be partially opened at the low position, after port 39c is closed. This will permit gradual utilization of the high ratio gears as will be explained.

By movement of the valve 60 clockwise from "low" position one stage further, the port 36c is moved out of register, and closing of the port 36a effected whereby the gears 27—28 are locked. At the same time port 38c is brought into register with ports 38a and 38b, affording a vent for oil from the right port chamber 34 of gears 27'—28' and keeping port 39a still closed. Differentials 47 now being forced to travel on the pinion 30 of the gear 28, the opposite pinion 30 and its gear 27' are forced to turn clockwise at twice the speed of the shaft 10. This propels the gear 28' four turns counter-clockwise for one turn of the shaft 10, causing the lower differentials 48 to travel their orbits twice in the same direction on the stationary right pinion 31, carrying with them the studs of the driven shaft 12 which is thus rotated two turns counter-clockwise for each turn of the shaft 10 or motor. This is the "high" speed position of the valve 50 and also represents the maximum ratio of which the present structure is capable, and in motor vehicles may be equivalent to what is known as an "overdrive" or one in which the vehicle drive shaft is rotated faster than the motor crank shaft or driving shaft.

It will be apparent, however, that while the valve 50 is in position intermediate of the low and high positions, various degrees of utilization of the low and high gear trains may be effected.

The ends of the port 36c may be widened as in Figure 5, so that it remains in full register with ports 36a—36b until the port 39c is fully open, and the latter is also widened so that it remains in full register while the port 36c is moved to closed position. When both ports 36c and 38c are open, there will be a gradual beginning of movement of the gears 27'—28', and a consequent higher ratio of transmission, if the device is installed in a motor vehicle and the latter is not travelling too steep an ascent. In the latter event, the tendency of the load to reverse the gears 27'—28' is opposed by the closure of ports 39a—39b, and automatically the low gear is caused to function. But by a partial movement of the valve toward closed position of port 36c, movement of the gears 27—28 is gradually checked, and differentials 47 will slowly begin to travel on pinion 30 of gear 28, there then being a partial positive low gear transmission through gears 27—28, and a slight degree of additional motion transmitted through gears 27'—28'. As the valve is moved further this component of transmission through gears 27'—28' will be increased until full high gear transmission is attained, or it may be stopped at any intermediate position to maintain the particular ratio less than full high ratio, and more than the low ratio of gears 27—28.

When the valve 50 is in neutral position, by movement thereof counter-clockwise one stage, the by-pass or reverse part 55 in the valve is brought into registry with ports 36a and 38a, while widened port 39c is continued in registry with ports 39a—39b. With the ports in this position and relation, the gears 27—28 operate as a pump and the gears 27'—28' also, as in the neutral position. In addition, however, instead of the discharge from gears 27—28 being spilled at 36b, it is directed to the duct 38 which is the intake for gears 27'—28' operating as a pump. The supply of oil from gears 27—28 is greater than that which gears 27'—28' tend to draw, and consequently gears 27'—28' are caused to turn sufficiently to cause rotation of the shaft 12 clockwise one turn for each turn of the shaft 10. This ratio may be reduced by control of the degree of opening of the port 55. It should be noted that the valve face between ports 36c and 55 is narrower circumferentially than the port opening 36a so that no complete closure of port 36a occurs, between ports 36c and 55, and a substantial waste of oil through spill port 36b may be effected when desired, permitting rapid operation of the drive shaft 10 to a relatively slow movement of shaft 12. It may also be found desirable to make the gears 27'—28' wider than gears 27—28, affording greater capacity to the gears 27'—28' as a pump, so that by positive feed of the full discharge of gears 27—28 to gears 27'—28' a positive low gear ratio drive of the shaft 12 will be effected. This will be in accord with the relative stresses on the gears in driving the vehicle.

Figure 10:
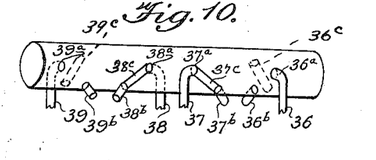
Figure 10 is a view similar to Figure 8 showing an arrangement for "free wheeling."

For normal driving no port connection or spill port 37b is required in association with the duct 37, but (see Figure 10) if free wheeling or coasting action is desired, a port passage may be provided in the valve at 37c arranged to connect ports 37a—37b by a clockwise movement of the valve to a third stage from neutral, which is one unit or stage from normal high ratio transmission position and the high speed port 38c is then broadened at each end the same as are the ports 36c and 39c and in such direction as to remain in register with the respective ports 38a and 38b while the port 37c is moved to full register position with ports 37a—37b. In this way the device functions for high ratio transmission as long as propulsion is required, but if the throttle of the associated motor is closed and the vehicle tends to move faster than the propulsion effect of the transmission and tends to "over-run" the motor, then the gears 27—28 tend to reverse their movement, while gears 27' and 28' continue and a vent is provided for the oil discharge to the duct 37. Or, if desired, a low pressure vent valve 41 may be provided on the pipe 37' so that the free wheeling action will be automatic. If the auxiliary port 37c is utilized, the valve 41 is made to retain higher pressures, so that a positive driving connection may be maintained at normal high ratio transmission, and over-running of the motor prevented. If desired, any familiar means may be utilized to stop the valve at normal "high" position, so that the free wheeling action will be manifest only when desired.

Utilizing the valve 41 for free wheeling, when the valve 50 is set "high" position, if a vehicle in which the transmission is incorporated should proceed down a grade and tend to "over-ride" the motor, there is a tendency to rotate the gears 27'—28' faster than they are being driven by the motor. This develops force tending to reverse the gears 27—28, and operating as a pump, they then take in oil through pipe 36' and develop pressure in the duct 37 and its extension 37', which is normally the intake side. The valve 41 of pipe 37' then vents this pressure freely, permitting the car to move forwardly independently of the motor.

The control

The operation of the valve 50, as has been indicated, is through a yoke 54, which, when the parts are in neutral position, extends forwardly and upwardly at an angle of about 40 degrees to the horizontal more or less, and this is on a radius of the valve in line with and on dead center with the operating links 56, pivoted at 56' on the sides of a sleeve 57, longitudinally slidable on a horizontal tube 58 extending forwardly from the upper connecting part 51 of the valve casing 45 and just clear of the valve 50 where it extends between the two end portions of the casing. This tube is interiorly threaded at its rearward end and screwed onto an exteriorly threaded boss 59 formed on the medial part of the casing 45. The front end of the tube is revolubly bushed in an exteriorly threaded screw cap 60, screwed into a nipple 61 of a control casing or cover 62 bolted to the housing 16. The medial part of the valve casing is extended rearward as at 63 to afford a body in which a small or high pressure cylinder 64 is bored, coaxial with the boss 59, and a larger low-pressure cylinder 65, forwardly of, and forming a coaxial continuation of the first, as well as opening through the boss 59. The cylinder 64 is closed at its rear or outer end by a screw plug 66 engaged in a tapped enlargement of the bore, and from the outer end of this bore 64 there extends a duct 67 within the casing 45, opening into the port passage 39a, forming communication therefrom to the cylinder 64.

While the terms "high pressure cylinder" and "low pressure cylinder" have been used in reference to the cylinders 64 and 65, this is done for convenience in distinguishing them, and it may be that the relative pressures may be different, depending as they do on the load to a large extent, as well as the speed of the motor. The pressures from the two sets of gears are communicated to separate cylinders in order that the cylinders may be properly proportioned as experience shows desirable to equalize the effects of the two pressures due to differences in the gear ratio; or tendency to reversal or retardance of motion of one set of gears by predominance of pressure from the other; or spillage from retarded gears through open ports of discharge from working gears, unretarded or less retarded.

Figure 3:
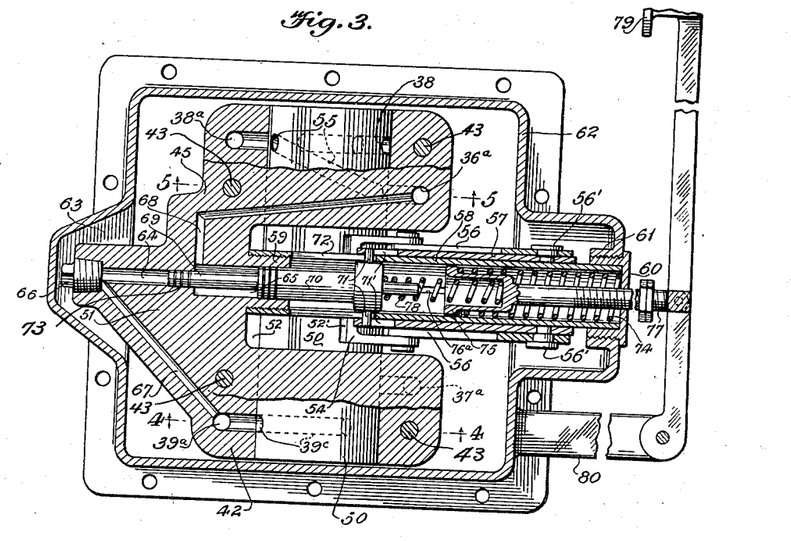
Figure 3 is a horizontal section on the line 3—3 of Figure 2, looking downward, showing the valve in neutral position.

From the rearward end of the large or low pressure bore 65 a duct 68 is also formed in the valve casing and opening into the port passage 36a. Slidable in the bores 64—65 there is an integral double piston having a reduced piston 69 in the small bore and a large piston 70 engaged in the large bore. The two bores are of equal extent longitudinally. A cross pin 71 is fixed on the front end of the double piston (which is suitably extended and enlarged for the purpose) having ends projecting horizontally through slots 72 in respective sides of the tube 58 and engaging the ends of these slots to limit forward movement of the pistons to approximately the position shown in Figure 3 where a substantial part of each piston is still engaged in its respective bore. These parts of the piston are circumferentially grooved and may have packing therein if desired, as at 73.

The pin 71 is also projected through short slots 71' in the sleeve 57 lying at the rearward parts of these last slots at neutral position of the parts. The piston is normally pressed upon in a rearward direction by spring means 78 (relieved in Figure 1 and also opposed by links 56), including a base spring 74 which should be very heavy, that is to say, strong, within the front end portion of the tube 58, its front end being seated against the cap 60 while its rearward end bears against the rearward end flange or shoulder 75 of a seat plunger 77 slidable in the tube 58 and having a reduced stem slidably engaged through the cap 60 which is suitably apertured therefor. The rearward end 75 of this seat member is enlarged and recessed to receive the front end of a main spring 78 weaker than the one 74, its rearward end bearing against the piston and being held centered in the tube by a stud on the piston. Opposite pins 76 (Fig. 1) are projected from the part 75 through long slots 76a in tube 58 and slots 76b in the sleeve 57. These two springs are adapted to be relieved of compression at least partially by operation of the plunger 75 which is moved by means of a foot pedal 79 connected suitably to the outer end of the stem of the plunger, being pivotally mounted on a stud bracket 80 at the right hand side of the control casing 62 and extending beyond the left hand side of the housing 16 a suitable distance. The pedal 79 has an arm 82 (Fig. 2) extending upwardly and rearwardly to engage in the notched central and forward extremity 83 of a front base arm 84 of a starting or forward and reverse selector hand lever 85, by which means the operator determines only whether the transmission shall be neutral, or operate forwardly or reverse. This arm is arranged to swing up and down in the present instance and in the relation of parts shown the valve is in neutral position, the arm 84 being held by the spring-pressed pedal arm 82 opposing movement of the notch at 83 in either direction. Upper and lower reverse and forward notches 86 and 87 are located some distance rearwardly of the notch 83 on the arm 84 to receive the arm 82 alternatively. The lever 85 also has a base rearward arm 88 having a longitudinally slotted forked extremity in which is engaged the cross pin 89 of a plunger 90 slidably engaged vertically through the top of the casing 62. The lower end of the plunger is formed with a horizontally elongated eye 91 having rectilinear parallel upper and lower sides extending fore and aft and having rollingly engaged therein a wiper roll 92 carried between ears 93 at the rearward extremity of a lever arm by which the links 56 are operated yieldingly to turn the valve a limited extent. For this purpose the links 56 are stamped integrally from sheet metal as two parallel L-shaped bell crank levers pivoted at the angles of the levers on pins 56' fixed on the sleeve 57. The arm connected to the yoke 54 are the links proper, while shorter arms 95 extend upwardly a distance above the sleeve 57 and are bent over and joined integrally above this sleeve. The joining part 96 of the bell cranks is preferably formed on a planiform part, termed a "flat," approximately horizontal when the valve is in neutral position, and having a substantial extent from front to rear. A stud bolt 97 is engaged therethrough, projecting upwardly therefrom and having a spring 98 therearound, confined by a nut on the upper end of the bolt. The arm 94 carrying a comparatively broad plate 99 curved slightly on its forward part to lie as a rocker on the flat part 96 of the bell crank member, its rearward part being cut away centrally and its lateral edge portion turned up to form stiffening flanges and rearwardly projected ears 93. The belt 97 extends upward through the plate 99, and the spring 98 bears upon the plate 99 so as to hold the latter yieldingly in operating relation to the flat 96 of the bell cranks and links 56.

*Operation of the control*

Figure 7:
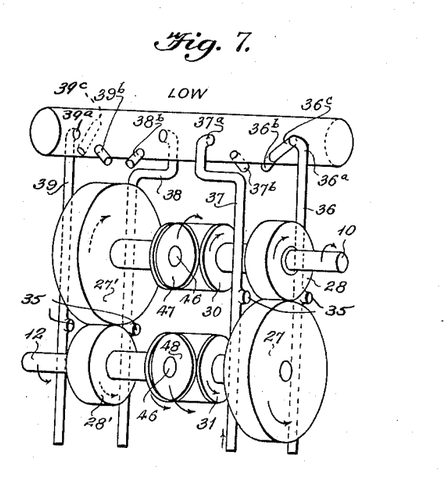
Figure 7 is a similar view showing the system operative for low ratio transmission.
Figure 9:
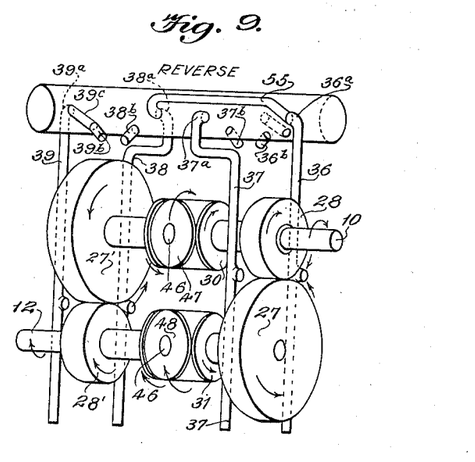
Figure 9 is a similar view showing the system operative for reverse of the driven member.

It will be apparent from the foregoing that rearward movement of the lever 85 will tend to depress the lever arm 94, and likewise tends to cause compression of the links 56 by reason of the clamping of the arm 94 to the flat 96, and if not opposed, this will set the valve at "low" position, as indicated in Figure 7. Likewise, forward movement of the lever 85 from the neutral position of Figure 1, and release of the pedal, will tend to raise the arm 94 and also tends to raise the links 56 and move the valve to "reverse" position as indicated in Figure 9. Various constructions for coaction of the lever 85 with the automatic control may be provided, or other device provided instead of the lever 85, as found desirable, but in the present instance, in order to shift the lever 85 from "reverse" to "neutral" and "low" it is necessary to depress the foot pedal.

Neither of the movements of the valve 50 by the lever 85 can occur however, as long as the pedal 79 is fully depressed, since this draws the seat plunger forwardly and by its pins 76 engaging the ends of the slots 76b in the sleeve 57 moves the valve positively to neutral position. When the pedal is released the spring 74 expands, compressing spring 78 and moving pins 76 rearward in the sleeve 57. The resultant effect of movement of lever 85 in either direction from neutral position is simply to insure the direction of movement of the links 56 from dead center after release of the pedal 29, and action of the valve in response to pressure of the springs 74—78 and oil pressures in the cylinder. The valve can not move to neutral position by action of the piston, because piston movement is stopped by cross pin 71 in slot 72 before the cross pin 71 carries the sleeve 57 to its limit by engagement with the forward ends of the slots 71'.

When the lever 85 is shifted from "neutral" and the pedal is released, should there be low hydrostatic pressure in the system the springs 74—76 will press the piston rearwardly, drawing the sleeve 57 and moving the valve toward "high" position against the action of the spring 98 which tends to cause retention of the valve at "low" position. But if the lead is excessive it will quickly cause building up of pressure in duct 36a and movement of the piston against the springs 74—78 with consequent movement of the valve 50 toward "low" position and opening of port 36a. Pressure in the passage 39 then is maintained at sufficient high stages to keep the valve in this position until the device may operate for automatic return toward "high" ratio position, as hereinafter described.

It will appear, therefore, that under the present construction in normal operation the only positive movement of the valve is that exceptionally effected by the pedal moving the valve to "low" or "neutral," and a moderate positive movement by pedal and lever 85 to "reverse." It will be noted that in reverse operation the valve can not be moved by action of the pistons or springs 74—78 from the reverse position. It can also be readily understood that the valve may at any time be moved to "low" or "neutral" position while the vehicle is in motion, and whether the motor is operating or not. In the movement toward neutral position, the device serves as a very effective brake, its action being modulated to an extent dependent solely on the position of the pedal and not on pedal pressure.

*Vehicle use*

Figure 8:
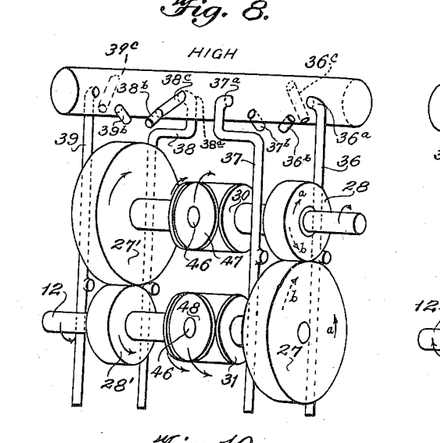
Figure 8 is a similar view showing the system operative for high ratio transmission.

Assuming that the apparatus is in the neutral position shown, being installed in a motor vehicle, and the motor in operation, in order to start the vehicle forward the pedal 79 is first depressed to release the arm 82 from the notch 83, and the lever 85 then shifted rearwardly. The pedal is then released, permitting the arm 82 to move rearwardly to the notch 87. The tension applied through the arm 94 to the links 56 by the first movement of the lever 85 now throws the links 56 off center downward, and the expanding spring 74 carries the seat member 75 rearwardly clearing the pins 76 from the forward ends of the slots 76b so that the sleeve 57 moves rearward, turning the valve to "low" position. The spring 78 is also compressed so that it tends to move the piston 69—70 rearwardly, the first part of this movement carrying the pin 71 along the slots 71' until the rear ends of these are engaged, or keeping the pin so engaged during the first part of the movement of the sleeve. If there is high oil pressure the sleeve is free to move until the pin 71 engages the front ends of the slots 71' when it is checked with the valve moved only to "low" position, and the sleeve is free to be returned toward "neutral" position by pedal operation, if desired. The pin 71 can not follow such forward movement of the sleeve because of engagement of the pin at the front ends of slots 72, but serves to stop such movement of the sleeve at neutral position if the pedal is operated, by again engaging the rear ends of the slots 71'. In case of low oil pressure being manifest, the first part of movement of the piston by the spring 78 produces no effect, by reason of the lost motion relation of the pin 71 in the slot 71', but the pin then engages in these slots moving the sleeve 57 rearward, carrying the valve toward "high" position, as in Figure 8. With the motor in operation, however, the hydrostatic pressure in duct 36 is quickly built up and communicated through duct 68 to the cylinder 65, moving the piston forwardly again against the actions of the springs 74—78 and after a short movement of the pistons the pin 71 again engages the front ends of the slot 71', moving the sleeve and turning the valve back to "low" position, as in Figure 7. In the early part of this movement, pressure built up by gears 27'—28' in duct 39 is communicated through duct 67 to the cylinder 64, contributing to counter-clockwise movement of the valve until the reduction of the ratio of transmission has enabled the power applied through shaft 12 to overcome the inertia of the vehicle. In this final position, only pressure in duct 39 is effective, through cylinder 64, to maintain the valve in "low" position. When the vehicle starts and its motion has been accelerated to a stage where the motor is operated at a moderate to maximum speed for the throttle opening set by the operator, a fall of pressure occurs in the duct 39 and cylinder 64, and the springs 74—78 then move the piston rearwardly, drawing the sleeve 57 rearward and causing the links 56 to move the valve clockwise so as to bring the port 38c gradually into lap with its respective ports 38a and 38b and begin closure of port 36c, which partially retards gears 27—28 and communicates pressure to cylinder 65, resulting in utilization in part of the higher ratio of gears 27'—28'. This tends to increase pressure momentarily or to sustain it by adding pressure in cylinder 64, but actually a progressive fall occurs as further momentum is developed in the vehicle by operation partially of gears 27'—28' simultaneously with gears 27—28. Normally the vehicle continues to gain headway and pressures continue to fall in the cylinder 64 with a slightly compensating increase in cylinder 65, permitting the springs 74—78 to move the piston forwardly and turning the valve clockwise with utilization of an increasing component of the ratio of gears 27'—28' by increased retardance of gears 27—28 until the latter are finally locked (see Fig. 8) and full overdrive is attained.

If the vehicle is ascending a steep grade, or is heavily loaded, the full overdrive may not be attained and the clockwise movement of the valve as last described may be checked or even reversed as the increased load tends to resist operation of gears 27'—28' and this reacts on gears 27—28, causing them to tend to rotate with greater force against the retarding liquid in duct 36. This pressure so overbalances the springs that transmission continues with the valve at some intermediate position between low and high positions, utilizing proportionate components of the ratio of the two sets of gears according to the aggregate pressure on the pistons, and the adjustment of the compression of the springs by the cap 60, or other spring adjusting means. This adjustment may be varied to correspond to the load and efficiency of the motor, but generally, with gears correctly designed for the given vehicle and its maximum proper load, and the springs normally adjusted, the operation of the device tends to automatically accommodate itself to various loads and grades. However, as will be explained, the operator may, with the structure described, positively vary the action of the springs 74—78 to compensate for heavy loads by use of the pedal 79, as will be explained. This will serve, by momentary operation, to enable satisfactory utlization of an underpowered outfit by utilizing lower ratios for intermediate operations, and on certain grades which would not require so low a ratio for lighter loads, or with a more powerful or more efficient motor.

As the connection with the yoke 54 swings downward the links 56 will thereby be drawn rearwardly, bringing the roller 92 rearwardly in the eye 91. The springs 74—78 having pressed the pistons rearwardly until the cross pin 71 is at the rearward end of the slot 71', it will be maintained at the rearward ends of the slots 71' during the ratio changes incident to normal acceleration of a vehicle.

The adjustment of tension of the springs 74 and 78 may be by means of the cap 60 which may be screwed in or out to compress the springs more or less, or other means of greater range may be provided. Nuts 101 may be provided on the stem of the plunger to act as stop means limiting forward movement of the plunger. As the pressure reaches a high sufficient to overcome the resistance of the spring 78 the plunger 75 may be moved backward slightly by depressing the pedal 79 without changing the transmission effect or position of the valve, due to movement of pin 71 in the slot 71'. But this movement will be limited by the slot 72 so that no further movement beyond "low" will be thus effected.

If at any time it should be desired to arbitrarily lower the ratio of transmission, this may be effected by pressure on the foot pedal to any extent desired, which has the same effect as increased hydrostatic pressure, relieving the compression of the springs so that comparatively low pressure may move the piston 64—70 forwardly turning the valve counter-clockwise. This unlimited use of the pedal is permissible with the construction of Figure 1.

It is also possible to positively move the valve to low gear position by partial depression of pedal, and when the plunger 75 is drawn forwardly to a proper distance, the lever 85 is free to be moved toward neutral position so that if desired, it may be retained thereby notch 89. Full forward movement of the pedal will cause the plunger 75 to move the pins 76 to engage the ends of slots 76b and so move the valve to neutral position (which would have the effect of a positive brake or lock of the vehicle wheels).

In regard to the form of the gears, the teeth may be elements of spirals of high pitch—that is, slightly inclined from elements parallel to the axis of the gear—so that quietness may be assured, and they may be epicycloidal. But it is thought desirable that they vary as little as possible from parallism with the axis.

It will be appreciated that the hydrostatic pressures developed in this transmission will be proportional to the torque transmitted or communicated to the driven member of the transmission, and that therefore the action of the pistons 69 and 70 and valve, may be said to be responsive to the load carried by the transmission. The force necessary to move the vehicle or other mechanism operated from the driven member of this transmission may be said to be the load. It is the intent of the claims that the term "manual means" or the like, shall also include pedal means.

The housing 14 may be mounted in any usual way as the flywheel housing of an internal combustion motor, and for this purpose a suitable mounting plate 100 is provided, bolted to the housing as indicated at 101, the base portion only being shown, the remainder being constructed in any conventional form to adapt it to a particular motor.

It will be understood that while the gear cases and gear sets in this particular instance have been shown as duplicates, they may be variously proportioned relatively. One set need not have the gears different in size while the other may have large and small gears. They may also be inverted from the order here shown, as will be understood, to adapt the device to particular uses.

The power may be applied through the bottom shaft if desired, or the transmission inverted from the position shown. Power may be taken from the driven shaft at both ends, which would make the device particularly desirable in a four-wheel-drive, or as a transmission for airplanes with tractor and propeller blades at front and rear, respectively.

The valves 41 on the pipes 36', 38', and 39' should be pressure relief valves of very high pressure retaining capacity, so that they serve as safety devices to avoid dangerously high or "overload" hydrostatic pressures. They are normally closed to retain the working pressures.

Before the valve 50 reaches the positive "low" ratio position when being moved from "neutral"

position, it is possible of course to obtain the effect of lower ratio transmission by moderation of the oil flow from the gears 27'—28' through port 39. To this extent the "low" position referred to herein does not represent the lowest possible ratio of transmission, but simply the lowest positive gear transmission ratio.

In starting, it is possible to modulate the application of power by a lower ratio of transmission than the positive low gear transmission, by not fully releasing the foot pedal after shifting the lever 85, but keeping the pedal depressed sufficiently to allow the port from pipe 39 to remain open partially, and very gradually releasing the pedal, so that a very gradual starting action is attained, before the full release of the pedal has moved the valve to full "low" position with port 39a closed.

It will be appreciated that by reason of the lost motion of the pin 71 in the slot 71' and the resultant delayed action of the valve, there will be a condition where in case of frequent slight fluctuations of the load the delay in response of the valve will result in its remaining at a mean position while the movements of the piston simply move the pin 71 in the slot 71'. This obviates liability of frequent and abrupt reversals of movement of the valve or jerky movements of a vehicle, as well as reducing wear of the transmission and the control means, in many ways that will be understood by those versed in the automotive and other trades where my invention is applicable.

It will also be appreciated that liability of damage to transmission gears by accidental movement of the control lever 85 is eliminated since it requires that the pedal be depressed before it can be moved, ordinarily, and also because when moved, there is no abrupt shock sustained by the transmission, due to the gradual functioning of the valve control and actuation means.

There is a further element of safety from damage to transmission parts, such as the differential in the rear axle, drive shaft, etc., by the functioning of the automatic relief valves 41.

I claim:

1. In a device of the character described, a transmission gear train having two elements, a ported case therefor to form a pump, a valve for the discharge of the pump comprising a ported casing, and a movable valve having a neutral free venting position, and movable therefrom to gradually restrict and stop the discharge, a cylinder in communication with the discharge of the pump between the pump and valve, a piston slidable therein, operative connections between the piston and valve, a spring engaging the piston in opposition to the cylinder pressure, and means to vary the compression of the spring.

2. The structure of claim 1 in which the valve is a rotary member having a radial operating arm, the connection with said piston including a member slidable in a plane with the arm, a link connected to the sliding member and arm at a position to lie on dead center when the valve is at said neutral position, and means to displace the link from dead center and to return it at will.

3. The structure of claim 1 in which the valve is a rotary member having a radial operating arm, the connection with said piston including a member slidable in a plane with the arm, a link connected to the sliding member and arm at a position to lie on dead center when the valve is at said neutral position, means to displace the link from dead center and to return it at will, releasable means to secure the lever in position to hold the link off dead center, including a yielding connection yieldable to operation of the sliding member by said piston.

4. The structure of claim 1 in which the means to vary the compression of the spring includes an opposed base spring of greater strength, and an interposed manually operable member movable to compress the base spring and to relieve it at will.

5. In a control for transmission gearings, gears cased to form a pump having a discharge port and intake, a valve for the discharge port consisting of a ported case and a movable valve having a free venting position and movable therefrom to restrict discharge from the discharge port, a cylinder in communication with the discharge port of the pump between the pump and valve, a piston slidable therein, operative connections between the piston and the valve, yielding means engaged with the piston in opposition to cylinder pressures tending to move the valve to closed position when displaced from said free venting position, separate manual means to move the valve from end to said free venting position, and means to yieldingly hold the valve in said free venting position, gear ratio changing means being included in operative relation to the piston.

6. The structure of claim 5 in which the valve has a pivoted operating arm, the connection with the piston including a member movable in a plane with the arm and a link connecting the said member and arm movable to dead center relation to the arm when the valve is at said free venting position.

7. The structure of claim 5 in which the valve is a pivoted operating member, the connection with the piston including a linkage adapted to stand on dead center when the valve is at said free venting position, means to displace the linkage from dead center and return it at will, releasable means to secure the linkage on dead center, and yielding means to hold the linkage off dead center, yieldable to operation of said piston.

8. The structure of claim 5 in which said yielding means engaged with the piston in opposition to cylinder pressures consists of a base spring of great strength and an interposed spring portion of lesser strength, and an adjustable support for the first spring movable to compress the base spring and to relieve it.

9. The structure of claim 5 in which said yielding means engaged with the piston in opposition to cylinder pressures consists of a base spring of great strength and an interposed spring portion of lesser strength, and an adjustable support for the first spring movable to compress the base spring and to relieve it, operable at will.

BINGHAM BURNER.